United States Patent
Sjogren

(10) Patent No.: US 7,055,460 B2
(45) Date of Patent: Jun. 6, 2006

(54) SMALL ANIMAL LITTER TRAY

(76) Inventor: Kjell Sjogren, Lavalvagen 6, Nacka, S-131 41 (SE)

( * ) Notice: Subject to any disclaimer, the term of this patent is extended or adjusted under 35 U.S.C. 154(b) by 0 days.

(21) Appl. No.: 10/257,066

(22) PCT Filed: Apr. 5, 2001

(86) PCT No.: PCT/SE01/00748

§ 371 (c)(1),
(2), (4) Date: Dec. 9, 2002

(87) PCT Pub. No.: WO01/76356

PCT Pub. Date: Oct. 18, 2001

(65) Prior Publication Data

US 2004/0025797 A1 Feb. 12, 2004

(30) Foreign Application Priority Data

Apr. 12, 2000 (SE) .................. 0001351.6

(51) Int. Cl.
*A01K 1/035* (2006.01)
(52) U.S. Cl. ...................... 119/166; 119/171
(58) Field of Classification Search ............... 119/166, 119/167, 172, 171
See application file for complete search history.

(56) References Cited

U.S. PATENT DOCUMENTS

| | | | | |
|---|---|---|---|---|
| 2,306,014 A | * | 12/1942 | Carson | 119/161 |
| 2,390,854 A | * | 12/1945 | Thompson | 119/161 |
| 2,971,493 A | * | 2/1961 | Robb | 119/166 |
| 3,752,120 A | | 8/1973 | Pallesi | |
| 3,941,090 A | * | 3/1976 | Fry | 119/171 |
| 4,517,920 A | * | 5/1985 | Yamamoto | 119/166 |
| 4,649,578 A | * | 3/1987 | Vargo | 119/161 |
| 4,771,731 A | * | 9/1988 | Derx et al. | 119/166 |
| 4,848,274 A | | 7/1989 | Yananton | |
| 5,271,355 A | * | 12/1993 | Bilings | 119/171 |
| 5,367,984 A | * | 11/1994 | Purnell | 119/166 |
| 5,515,812 A | * | 5/1996 | Faust | 119/166 |
| 5,699,754 A | * | 12/1997 | Cahajla | 119/166 |
| 5,755,182 A | * | 5/1998 | Brown et al. | 119/166 |
| 5,884,584 A | * | 3/1999 | Feldman | 119/171 |
| 6,363,888 B1 | * | 4/2002 | Sourek, Jr. | 119/172 |
| 6,408,790 B1 | * | 6/2002 | Maguire | 119/166 |
| 6,435,135 B1 | * | 8/2002 | Johnston et al. | 119/171 |
| 6,860,233 B1 | * | 3/2005 | Buttersack et al. | 119/171 |

FOREIGN PATENT DOCUMENTS

| | | |
|---|---|---|
| DE | 4127835 | 12/1992 |
| EP | 259293 A2 * | 3/1988 |
| EP | 0904689 | 3/1999 |
| EP | 1134497 A1 * | 9/2001 |
| JP | 09308403 A * | 12/1997 |

* cited by examiner

*Primary Examiner*—Robert P. Swiatek
(74) *Attorney, Agent, or Firm*—Dowell & Dowell, P.C.

(57) ABSTRACT

A small animal litter box which comprises an upper tray with a perforated bottom wall for carrying litter material, and a lower tray for receiving urine and particles dropping from the first tray through the perforated bottom wall thereof. The first tray contains litter material in the form of pellets that are disintegrated into smaller particles when the pellets absorb urine, and the perforated bottom wall has holes dimensioned such that smaller particles from disintegrated pellets pass through the holes while intact pellets are prevented from passing through the holes.

7 Claims, 1 Drawing Sheet

SMALL ANIMAL LITTER TRAY

CROSS REFERENCE TO RELATED APPLICATIONS

This application is a National Phase application claiming the benefit of PCT/SE01/00748 filed Apr. 5, 2001 which further claims priority benefit form Swedish application 0001351-6 filed Apr. 12, 2000.

BACKGROUND OF THE INVENTION

1. Field of the Invention

The present invention relates to a small animal litter box comprising a first tray with a perforated bottom wall for carrying litter material, and a second tray situated under the first tray for receiving freely dropping urine and particles that have passed through the perforated bottom wall of the first tray.

2. Description of the Related Art

A small animal litter box composed of two tray is disclosed in DE 41 27 635 A1. In the known litter box the two trays have identical circumferential walls with a truncated conical shape. This enables placing the first tray telescopically in the second tray, which is intended to stand with its bottom directly on the floor and thus carry the first tray. The perforated bottom wall has relatively small holes with a diameter of a few millimeters to permit drainage of urine from the first tray to the second tray, whereas all solid substances present in the first tray are to be prevented from passing the holes.

A problem of the known litter box according to DE 41 27 835 is that its stands relatively unstable on the floor due to the conical shape of the trays. This results in the risk of the small animal, for example a cat, or a human tipping over the litter box so that its contents is spread outside the litter box.

U.S. Pat. No. 4,848,274 discloses a small animal litter box that likewise is composed of an upper tray with a perforated bottom wall and a lower tray for receiving urine. In this case the upper tray is provided with a sideboard extending downwardly from the upper confining edge of the tray past the perforated bottom wall. As a result a space for the lower tray is defined between the sideboard, the perforated bottom wall and the floor, when the upper tray is placed on a floor. By means of the sideboard this known small animal litter box stands stable on the floor. Between the perforated bottom wall and the lower tray there is placed a liquid absorbing material. A locking device engages the two trays so that the liquid absorbing material is pressed against the perforated bottom wall. Thus, solid material can not pass through the perforated bottom wall down into the lower tray.

SUMMARY OF THE INVENTION

The object of the present invention is to provide an environmentally friendly hygienic small animal litter box, which is easy to keep clean and which is intended for such kind of animals that have an instinct to burrow there faeces.

This object is obtained by a small animal litter box of the kind initially stated characterized in that the first tray is intended to contain litter material in the form of pellets that are disintegrated into smaller particles when the pellets absorb urine, and the perforated bottom wall has holes, each of which is dimensioned such that smaller particles from a disintegrated pellet are able to pass through the hole while an intact pellet is prevented from passing through the hole.

Hereby the significant advantage is achieved that also litter particles that have absorbed urine easily can be removed from the small animal litter box with the aid of the second tray, which is a striking improvement in a hygienic sense as compared with traditional small animal litter boxes. The risk of polluted litter material getting stuck on the paws of the animal and being transferred to humans is substantially reduced.

For environmental reasons pellets of compressed wood-shavings with a thickness of between 4 and 7 mm can be used. Polluted wood-shavings from such wood-shaving pellets can conveniently be flushed down the toilet. For heating purposes there are currently cylindrical pellets of compressed wood-shavings on the market excellent for use in the small animal litter box according to the invention. Since these cylindrical pellets have a diameter of about 6 mm the holes of the bottom wall are suitably designed with a size of about 5 mm in diameter for circular holes. Generally, each hole should not be larger than 90% of the size of each pellet.

Advantageously, the sideboard is joined to the first tray and extends downwardly from the upper confining edge thereof past the perforated bottom wall, so that when the first tray is placed on a floor there is a space defined between the sideboard, the perforated bottom wall and the floor, wherein the second tray can be placed loose in said space. Besides the advantageous function to keep the first tray stable on the floor the sideboard also has the function to keep the second tray in place under the first tray. With the second tray placed loose in said space particles from this integrated pellets are thus able to pass through the perforated bottom wall and drop down into the second tray.

The small animal litter box will be particularly stable if the sideboard is designed as a truncated cone with the base situated on the floor.

The first tray preferably has a corner-less circumferential wall, suitably with oval cross-section, which makes the tray easy to clean. To further facilitate cleaning of the first tray the corner-less circumferential wall suitably has the shape of a truncated cone with the base situated at the upper confining edge of the circumferential wall.

DESCRIPTION OF THE PREFERRED EMBODIMENT

Figure 1:
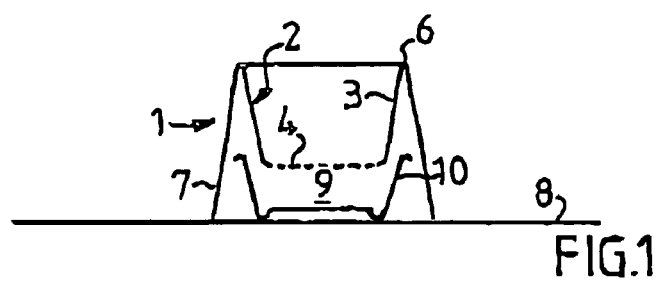
FIG. 1 is a vertical cross-section through a small animal litter box according to the invention placed on a floor.
Figure 2:
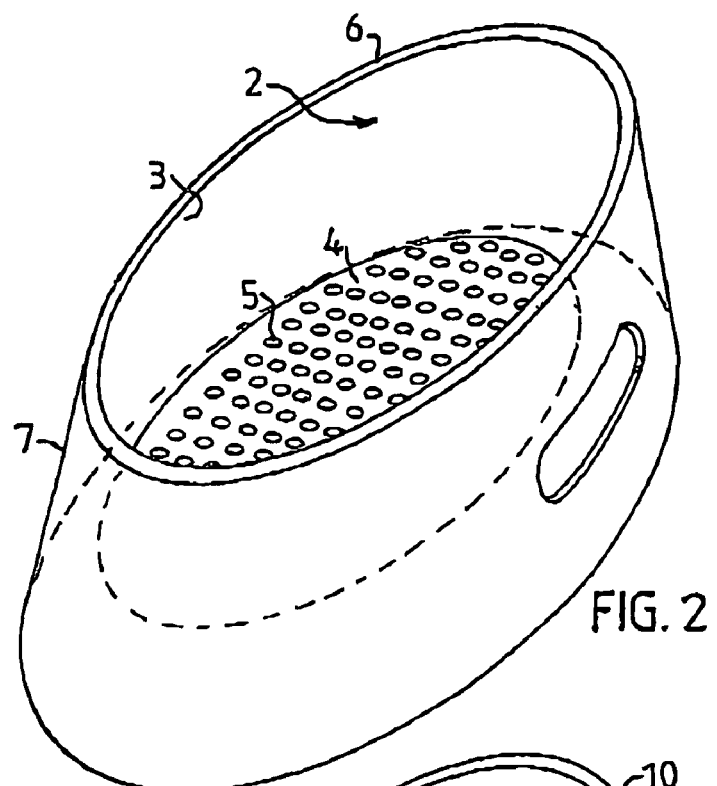
FIG. 2 is a view obliquely from above of an upper tray of the small animal litter box according to FIG. 1.
Figure 3:
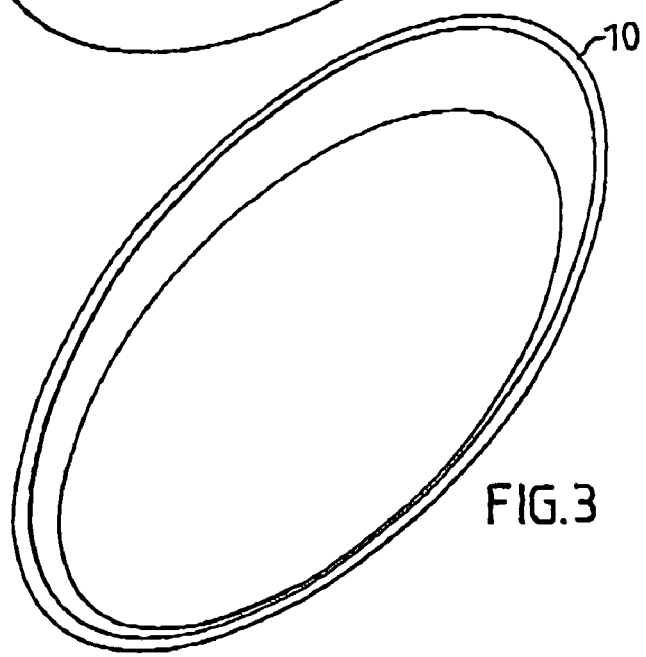
FIG. 3 is a view obliquely from above of a lower tray of the small animal litter box according to FIG. 1.

With reference to the figures there is shown a small animal litter box 1 comprising an upper tray 2 having a conically inwardly tapering circumferential wall 3 with an oval cross-section, and a perforated bottom wall 4 with circular holes 5. The holes 5 have a diameter of about 5 mm and are distributed across the entire bottom wall 4 with a distance between the centers of adjacent holes 5 of 15 mm. From the upper circumferential edge 6 of the circumferential wall 3 the sideboard 7 extends conically outwardly and downwardly past the bottom wall 4 to a floor 8, so that a space is defined between the sideboard 7, the bottom wall 4 and the floor 8. The tray 2 and the sideboard 7 are made in one single piece.

A lower tray 10 is placed loose in the space 9 under the perforated bottom wall 4. The tray 10 has an oval shape adapted to the upper tray 2, so that the tray 10 extends under the entire perforated bottom 4.

Both the tray 2 including the sideboard 7 arranged thereto and the tray 10 are suitably made of a rigid plastic material.

The small animal litter box illustrated is dimensioned in view of the animal species it is to serve, for example cat, rabbit, guinea-pig, rat or the like. With respect to the dimensioning of the box, consideration is also taken with regard to the eagerness of the animal species to scratch the litter material.

When using the small animal litter box according to the invention a relatively thin layer, about 1 to 2 cm thick, of wood-shaving pellets is placed on the bottom wall 4 of the upper tray 2. When, for example, a cat sits in the tray 2 to urinate, most of the urine will directly pass the thin layer of pellets through the holes 5 down into the lower tray 10. After the cat has relieved itself it will scratch over the pellets steeped in urine which causes other, now dry, pellets that have previously absorbed urine to disintegrate into smaller particles. The smaller particles that arise when the pellets are disintegrated drop, by the effect of the scratching of the cat, down through the holes 5 and are collected in the lower tray 10. When the cat defecates, wood-shavings will deposit on the surface of the feces, so that the feces easily can be removed from the upper tray 2 and advantageously be flushed away in a water closet.

Normally, each hole 5 has a diameter of between 4 and 7 mm, preferably 5 mm. Litter material for use in the small animal litter box consists of wood-shavings compressed to pellets with a thickness of between 4 and 7 mm, preferably 6 mm.

The invention claimed is:

1. A combination small animal litter box and litter material comprising; a litter box including a first tray having a perforated bottom wall including a plurality of holes, a litter material consisting of intact pellets of a first size which is larger than a dimension of each of the plurality of holes in said first tray, the pellets being formed of a material that disintegrates into smaller particles after absorbing urine and wherein the smaller particles are of a size to pass through the holes in said bottom wall of said first tray, said intact pellets being provided in said first tray, a second tray situated under said first tray for receiving freely falling urine and the smaller particles that have been formed by the disintegration of the intact pellets by absorbing urine and subsequently passed through the perforated bottom wall of said first tray, whereby substantially only urine absorbed smaller particles pass through the holes in the perforated bottom wall of said first tray and into said second tray while remaining intact pellets, which have not absorbed urine to enable them to disintegrate, are too large and are thus prevented from passing through the holes in said first tray.

2. The small animal litter box of claim 1 wherein each hole in the perforated bottom wall is circular with a diameter that is at most 90% of a diameter of the intact pellets.

3. The small animal litter box according to claim 1, wherein the intact pellets are formed of compressed wood-shavings.

4. The small animal litter box of claim 3 wherein the intact pellets have a thickness of between 4 and 7 mm.

5. The small animal litter box of claim 4 wherein the intact pellets have a thickness of approximately 6 mm.

6. The small animal litter box of claim 1 wherein each hole has a diameter of between 4 and 7 mm.

7. The small animal litter box of claim 6 wherein each hole has a diameter of approximately 5 mm.

* * * * *